United States Patent
Hwang et al.

(10) Patent No.: US 10,478,036 B2
(45) Date of Patent: Nov. 19, 2019

(54) CLEANER

(71) Applicant: LG ELECTRONICS INC., Seoul (KR)

(72) Inventors: Philjae Hwang, Seoul (KR); Eunji Sung, Seoul (KR); Taekgi Lee, Seoul (KR); Mantae Hwang, Seoul (KR); Jungbae Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 180 days.

(21) Appl. No.: 15/653,935

(22) Filed: Jul. 19, 2017

(65) Prior Publication Data

US 2018/0055321 A1 Mar. 1, 2018

(30) Foreign Application Priority Data

Aug. 25, 2016 (KR) .................. 10-2016-0108309
Dec. 30, 2016 (KR) .................. 10-2016-0183822

(51) Int. Cl.
*A47L 9/28* (2006.01)
*A47L 9/32* (2006.01)
(Continued)

(52) U.S. Cl.
CPC .......... *A47L 9/2884* (2013.01); *A47L 9/1683* (2013.01); *A47L 9/1691* (2013.01); *A47L 9/22* (2013.01);
(Continued)

(58) Field of Classification Search
CPC .... A47L 9/2884; A47L 9/1683; A47L 9/1691; A47L 9/22; A47L 9/28; A47L 9/2857;
(Continued)

(56) References Cited

U.S. PATENT DOCUMENTS 8,156,609 B2   4/2012  Milne et al.
8,236,077 B2   8/2012  Gomiciaga-Pereda et al.
(Continued)

FOREIGN PATENT DOCUMENTS

EP   2811885   12/2014
GB   2522810   8/2015
(Continued)

OTHER PUBLICATIONS

International Search Report in International Application No. PCT/KR2017/006442, dated Aug. 30, 2017, 4 pages (with partial English translation).

(Continued)

*Primary Examiner* — Robert J Scruggs
(74) *Attorney, Agent, or Firm* — Fish & Richardson P.C.

(57) ABSTRACT

A cleaner includes: a suction unit that guides air and dust; a main body connected with the suction unit and including a dust separation unit that separates dust from air, and a dust container that stores dust separated by the dust separation unit, at least a portion of the dust container being transparent or translucent; a handle unit connected to the main body and has a battery; a power receiving component disposed in the main body to be supplied with power from the battery; wires that are connected to the power receiver; and a cover member coupled to the main body and disposed between the main body and the wires to prevent the wires from being seen from the outside of the dust container.

16 Claims, 22 Drawing Sheets

(51) Int. Cl.
*H02J 7/00* (2006.01)
*A47L 9/16* (2006.01)
*A47L 9/22* (2006.01)

(52) U.S. Cl.
CPC .............. *A47L 9/28* (2013.01); *A47L 9/2857* (2013.01); *A47L 9/322* (2013.01); *H02J 7/0045* (2013.01)

(58) Field of Classification Search
CPC ... A47L 9/322; A47L 5/24; A47L 5/26; A47L 7/0038; A47L 5/14; A47L 7/0042; H02J 7/0045
See application file for complete search history.

(56) References Cited

U.S. PATENT DOCUMENTS

| | | | |
|---|---|---|---|
| 8,444,731 | B2 | 5/2013 | Gomiciaga-Pereda et al. |
| 8,925,145 | B2 | 1/2015 | Wilson |
| 9,301,665 | B2 * | 4/2016 | Clothier ................ A47L 9/2831 |
| 2009/0265877 | A1 * | 10/2009 | Dyson ...................... A47L 5/24 15/344 |
| 2013/0160233 | A1 | 6/2013 | Peace et al. |
| 2013/0205538 | A1 | 8/2013 | Thompson |

FOREIGN PATENT DOCUMENTS

| | | |
|---|---|---|
| JP | 2011177595 | 9/2011 |
| JP | 2014008301 | 1/2014 |
| JP | 2016112283 | 6/2016 |
| KR | 10-2005-0057908 | 6/2005 |
| KR | 10-1127088 | 4/2009 |
| KR | 101307568 | 9/2013 |
| KR | 10-2016-0017090 | 2/2016 |
| KR | 10-2016-0034041 | 3/2016 |
| KR | 101649250 | 8/2016 |
| WO | WO2013093417 | 6/2013 |
| WO | WO2013117900 | 8/2013 |

OTHER PUBLICATIONS

Extended European Search Report in European Application No. 17843785.1, dated Aug. 9, 2019, 7 pages.

* cited by examiner

CLEANER

CROSS-REFERENCE TO RELATED APPLICATIONS

This application claims priority under 35 U.S.C. § 119 to Korean Patent Application No. 10-2016-0108309, filed in Korea on Aug. 25, 2016, and Korean Patent Application No. 10-2016-0183822, filed in Korea on Dec. 30, 2016, whose entire disclosure is hereby incorporated by reference.

BACKGROUND

The present disclosure relates to a cleaner.

Cleaners may be classified into a manual cleaner that a user moves in person for cleaning and an automatic cleaner that automatically moves for cleaning.

Manual cleaners may fall into, depending on the types, a canister cleaner, an upright cleaner, a handy cleaner, and a stick cleaner.

Handy cleaners, generally, may include a suction unit, a body, and a handle.

An extension pipe having a suction nozzle may be connected to the suction unit. Further, a battery for supplying power may be disposed in the handle.

When the suction nozzle includes a cleaning unit for sweeping carpets and a motor for rotating the cleaning unit, the motor is supposed to be supplied with power from the battery.

In order to supply power to the motor from the battery in the handle, the battery should be connected with the motor through a power supply wire and a control signal wire. The wires are connected to the suction unit through the body.

The main body may include a dust container that stores dust and the dust container may be transparent or translucent so that a user can visually check the dust in the dust container.

However, the wires pass through the main body, so it is required to prevent the wires from being seen from the outside through the dust container.

Meanwhile, in the related art, a handheld vacuum cleaner has been disclosed in Korean Patent No. 10-1127088 (registered on 8 Mar. 2012).

SUMMARY

The present disclosure provides a cleaner of which wires are not seen from the outside through a transparent or translucent dust container.

The present disclosure provides a cleaner in which a cover member for preventing exposure of wires has a terminal for electrical connection between a main body and a handle unit.

The present disclosure provides a cleaner in which a main body terminal and a handle terminal in a handle unit are easily connected by a cover member.

The present disclosure provides a cleaner in which a main body is prevented from being pushed down when a handle terminal is coupled to a main body terminal.

A cleaner includes: a suction unit that guides air and dust; a main body that is connected with the suction unit and has a dust separation unit that separates dust from air, and a dust container storing dust separated by the dust separation unit, at least a portion of the dust container being transparent or translucent; a handle unit that is connected to the main body and has a battery; a power receiving component that is disposed in the main body to be supplied with power from the battery; wires that are connected to the power receiving component; and a cover member that is coupled to the main body and is disposed between the main body and the wires to prevent the wires from being seen from the outside of the dust container.

A cleaner includes: a handle unit that has a PCB unit; a battery that is detachably coupled to the handle unit and is connected to the PCB unit when the battery is coupled to the handle unit; a main body that has a power receiver for being supplied with power from the battery and is combined with the handle unit; a handle terminal that is disposed in the handle unit and connected with the PCB unit; and a main body terminal that is mechanically coupled to the handle terminal when the handle unit is coupled to the main body, and is connected with the power receivers through wires.

DETAILED DESCRIPTION OF THE EMBODIMENTS

Figure 1:
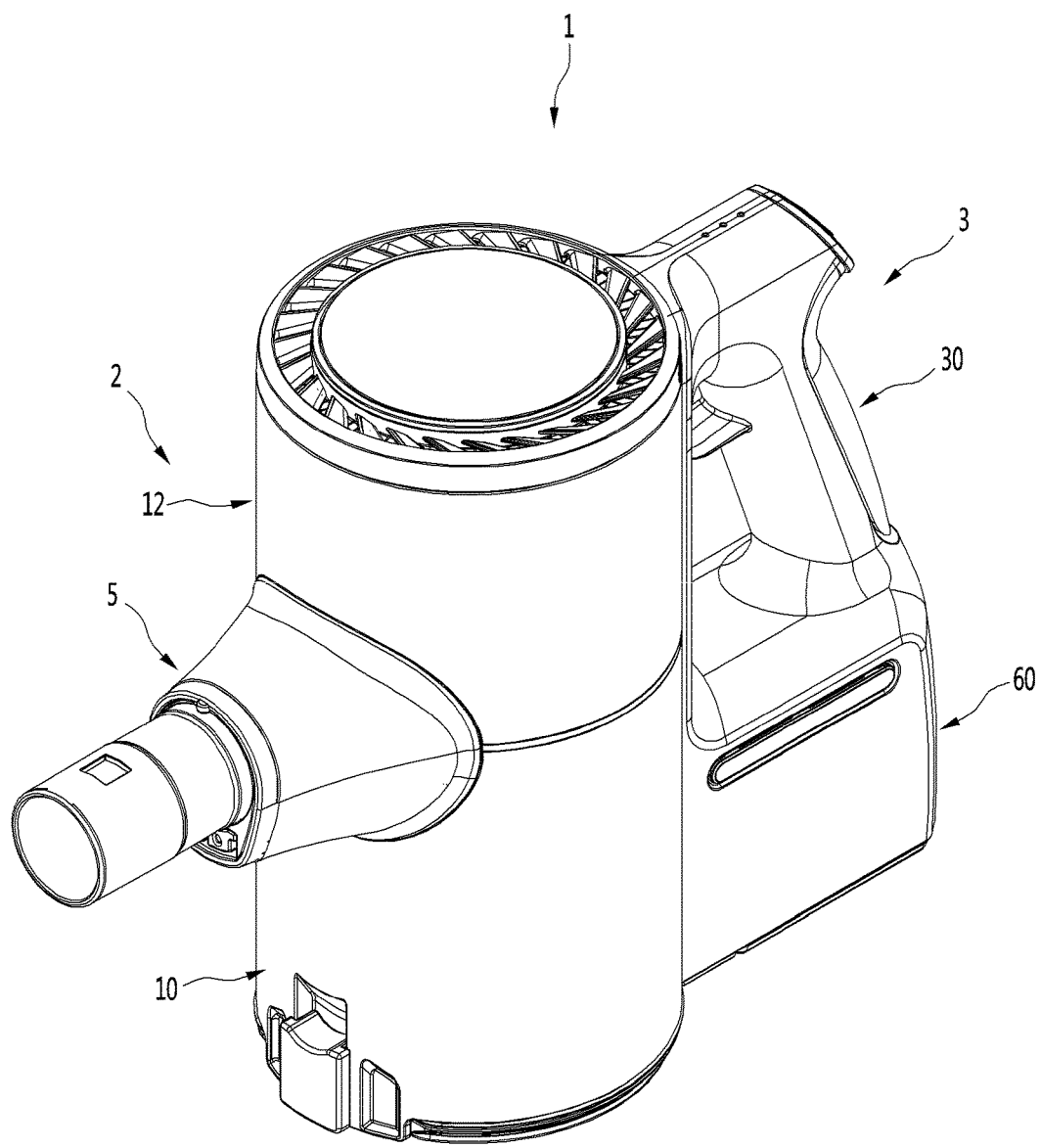
FIG. 1 is a perspective view of a cleaner according to an embodiment of the present invention.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
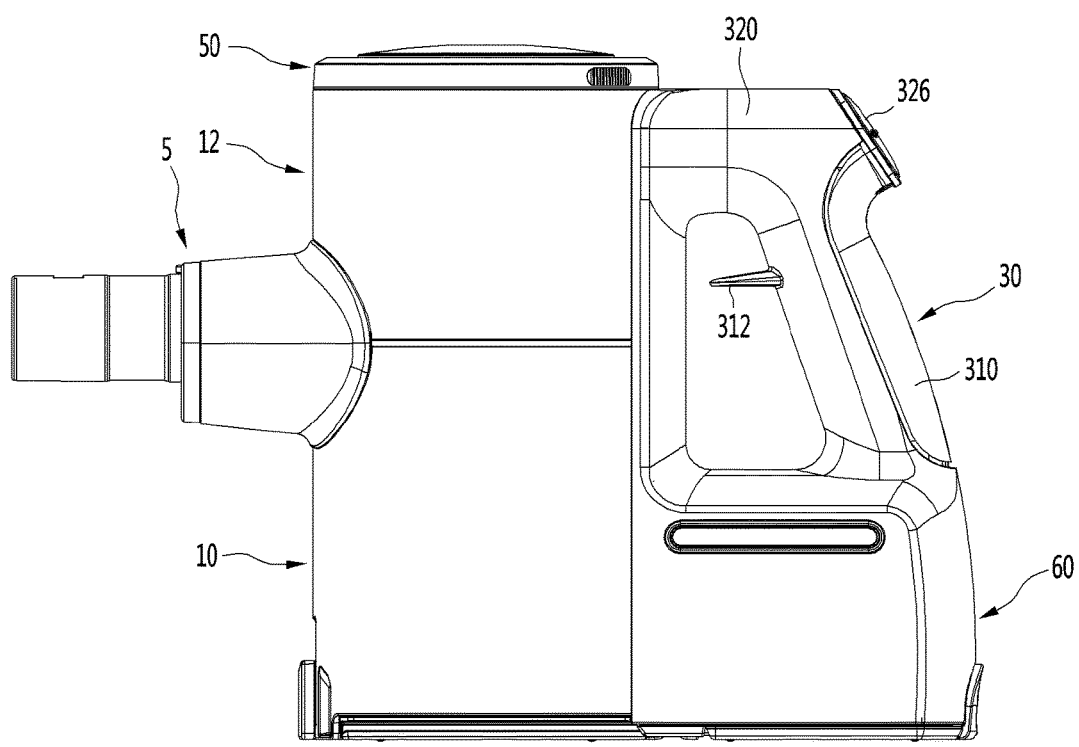
FIG. 2 is a side view of the cleaner according to an embodiment of the present invention.
Figure 3:
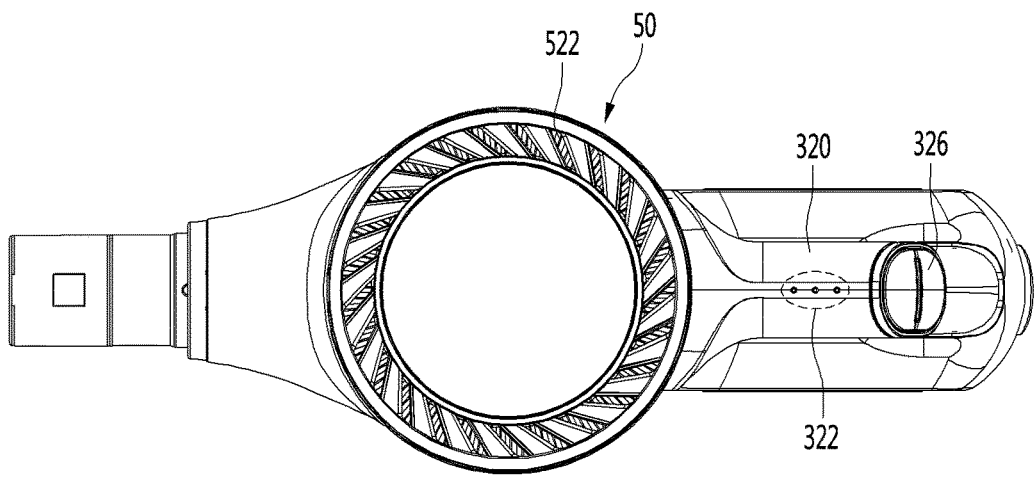
FIG. 3 is a plan view of the cleaner according to an embodiment of the present invention.
Figure 4:
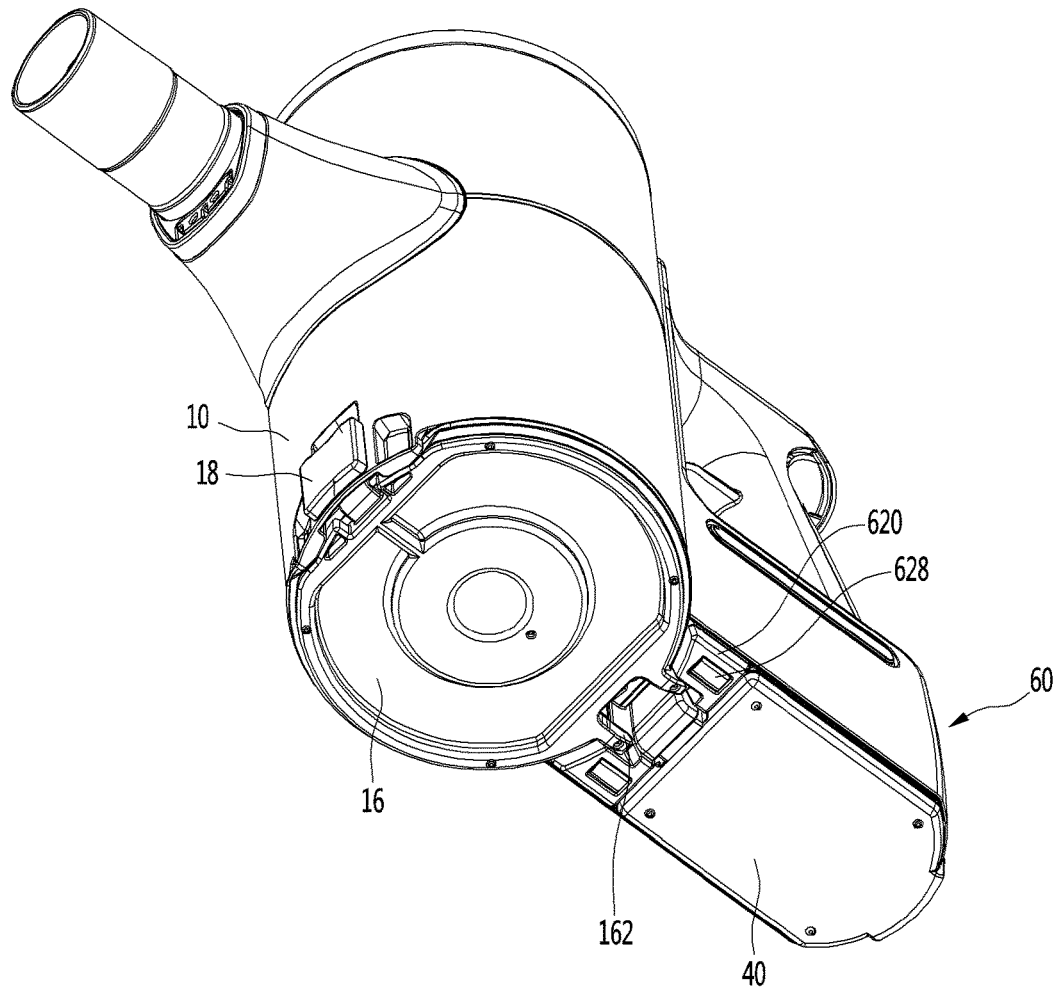
FIG. 4 is a perspective view of the cleaner according to an embodiment of the present invention when seen from under the cleaner.
Figure 5:
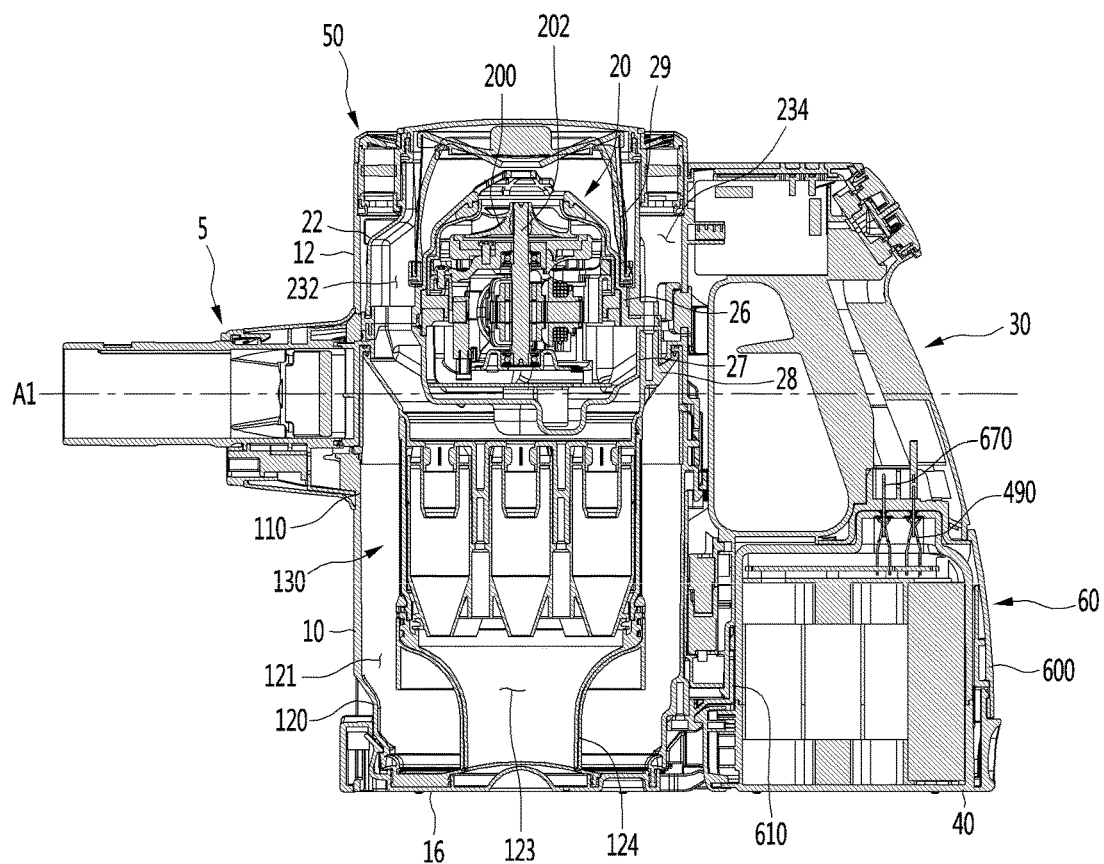
FIG. 5 is a cross-sectional view of the cleaner according to an embodiment of the present invention.

FIG. 1 is a perspective view of a cleaner according to an embodiment of the present invention, FIG. 2 is a side view of the cleaner according to an embodiment of the present invention, FIG. 3 is a plan view of the cleaner according to an embodiment of the present invention, FIG. 4 is a perspective view of the cleaner according to an embodiment of the present invention when seen from under the cleaner, and FIG. 5 is a cross-sectional view of the cleaner according to an embodiment of the present invention.

Referring to FIGS. 1 to 5, a cleaner 1 according to an embodiment of the present invention may include a main body 2.

The cleaner 1 may further include a suction unit 5 coupled to the front of the main body 2. The suction unit 5 can guide air containing dust into the main body 2.

The cleaner 1 may further include a handle unit 3 coupled to the main body 2. The handle unit 3 may be positioned opposite to the suction unit 5 on the main body 2.

That is, the main body 2 may be disposed between the suction unit 5 and the handle unit 3.

The main body 2 may include a first body 10 and a second body 12 on the first body 10.

The first body 10 and the second body 12 may be, though not limited thereto, formed in a cylindrical shape.

The suction unit 5 may be coupled to the main body 2 such that the center of the suction unit 5 is positioned approximately at the boundary between the first body 10 and the second body 12.

The main body 2 may further include a dust separation unit that separates dust from air sucked through the suction unit 5.

The dust separation unit may include a first cyclone unit 110 that can separate dust, for example, using cyclonic flow. The first body 10 includes the first cyclone unit 110 in this configuration.

The air and dust sucked through the suction unit 5 helically flow along the inner side of the first cyclone unit 110.

The axis of the cyclonic flow in the first cyclone unit 180 may vertically extend.

The dust separation unit may further include a second cyclone unit 130 that secondarily separates dust from the air discharged out of the first cyclone unit 110. The second cyclone unit 130 may be disposed inside the first cyclone unit 110 to minimize the size of the dust separation unit. The second cyclone unit 130 may include a plurality of cyclone bodies arranged in a raw.

As another example, the dust separation unit may include one cyclone unit, in which the axis of the cyclonic flow may also vertically extend.

The first body 10 functions as a dust container that stores dust separated by the cyclone units 110 and 130. The upper part of the first body 10 is the first cyclone unit 180 and the lower part of the first body 10 is the dust container. The first body 10 may be partially or entirely transparent or translucent to enable a user to visually check the amount of dust in the dust container.

The main body 2 may further include a body cover 16 for opening/closing the bottom of the first body 10. The body cover 16 can open/close the first body 10 by being rotated. A button 18 for rotating the body cover 16 may be disposed on the first body 10.

A hinge 162 of the body cover 16 may be coupled to hinge coupling portions 620 of the battery housing 60.

At least a portion of the second cyclone unit 130 may be positioned inside the first body 10.

A dust storage guide 124 that guides the dust separated by the second cyclone unit 130 to be stored may be disposed in the first body 10. The dust storage guide 124 may be coupled to the bottom of the second cyclone unit 130 in contact with the top of the body cover 16.

The dust storage guide 124 may divide the internal space of the first body 10 into a first dust storage part 121 where the dust separated by the first cyclone unit 110 is stored and a second dust storage part 123 where the dust separated by the second cyclone unit 130 is stored.

The internal space of the dust storage guide 124 is the second dust storage part 123 and the space between the dust storage guide 124 and the first body 10 is the first dust storage part 121.

The body cover 16 can open/close both of the first dust storage part 121 and the second dust storage part 123.

The cleaner 1 may further include a suction motor 20 for generating suction force and a battery 40 for supplying power to the suction motor 20.

The suction motor 20 may be disposed in the second body 12. At least a portion of the suction motor 20 may be disposed over the dust separation unit. Accordingly, the suction motor 20 is disposed over the first body 10.

The suction motor 20 may communicate with an outlet of the second cyclone unit 130.

To this end, the main body 2 may further include a discharge guide 28 connected to the second cyclone unit 130 and a flow guide 22 that communicates with the discharge guide 28.

For example, the discharge guide 28 is disposed on the second cyclone unit 130 and the flow guide 22 is disposed over the discharge guide 28.

Further, at least a portion of the suction motor 20 is positioned inside the flow guide 22.

Accordingly, the axis of the cyclonic flow in the first cyclone unit 110 may pass through the suction motor 20.

When the suction motor 20 is disposed over the second cyclone unit 130, the air discharged from the second cyclone unit 130 can flow directly to the suction motor 20, so the channel between the dust separation unit and the suction motor 20 can be minimized.

The suction motor 20 may include a rotary impeller 200. The impeller 200 may be fitted on a shaft 202. The shaft 202 is vertically disposed.

An extension line from the shaft 202 (which may be considered as the rotational axis of the impeller 200) may pass through the first body 10. The rotational axis of the impeller 200 and the axis of the cyclonic flow in the first cyclone unit 110 may be on the same line.

According to the present invention, there is the advantage that the path through which the air discharged from the dust separation unit, that is, the air discharged upward from the second cyclone unit 130 flows to the suction motor 20 can be reduced and a change in direction of air can be decreased, so a loss of airflow can be reduced.

As the loss of airflow is reduced, suction force can be increased and the lifetime of the battery 40 for supplying power to the suction motor 20 can be increased.

The cleaner 1 may further include an upper motor housing 26 covering a portion of the top of the suction motor 20 and a lower motor housing 27 covering a portion of the bottom of the suction motor 20. The lower motor housing 27 may be integrally formed with the second body 12 or may be coupled to the second body 12.

The suction motor 20 may be disposed inside the motor housings 26 and 27 and the flow guide 22 may be disposed to cover the upper motor housing 26.

At least a portion of the flow guide 22 may be spaced apart from the upper motor housing 26. Further, at least a portion of the flow guide 22 may be spaced apart from the second body 12.

Accordingly, a first air passage 232 is defined by the inner side of the flow guide 22 and the outer side of the upper motor housing 26 and a second air passage 234 is defined by the outer side of the flow guide 22 and the inner side of the second body 12.

The air discharged from the second cyclone unit 130 flows to the suction motor 20 through the first air passage 232 and the air discharged from the suction motor 20 flows through the second air passage 234 and is then discharged outside. Accordingly, the second air passage 234 functions as an exhaust channel.

The handle unit 3 may include a handle 30 for a user to hold and a battery housing 60 under the handle 30.

The handle 30 may be disposed behind the suction motor 20.

As for directions, with respect to the suction motor 20 in the cleaner 1, the direction in which the suction unit 5 is positioned is the front direction and the direction in which the handle 30 is positioned is the rear direction.

The battery 40 may be disposed behind the first body 10. Accordingly, the suction motor 20 and the battery 40 may be arranged not to vertically overlap each other and may be disposed at different heights.

According to the present invention, since the suction motor 20 that is heavy is disposed ahead of the handle 30 and the battery 40 that is heavy is disposed behind the handle 30, so weight can be uniformly distributed throughout the cleaner 1. It is possible to prevent injuries to the user's wrist when a user cleans with the handle 30 in his/her hand. That is, since the heavy components are distributed at the front and rear portions and at different heights in the cleaner 1, it is possible to prevent the center of gravity of the cleaner 1 from concentrating on any one side.

Since the battery 40 is disposed under the handle 30 and the suction motor 20 is disposed in front of the handle 30, there is no component over the handle 30. That is, the top of the handle 30 forms a portion of the external appearance of the top of the cleaner 1.

Accordingly, it is possible to prevent any component of the cleaner 1 from coming in contact with the user's arm while the user cleans with the handle 30 in his/her hand.

The handle 30 may include a first extension 310 extending vertically to be held by a user and a second extension 320 extending toward the suction motor 20 over the first extension 310. The second extension 320 may at least partially horizontally extend.

A stopper 312 for preventing a user's hand holding the first extension 310 from moving in the longitudinal direction of the first extension 310 (vertically in FIG. 2) may be formed on the first extension 310. The stopper 312 may extend toward the suction unit 5 from the first extension 310.

The stopper 312 is spaced apart from the second extension 320. Accordingly, a user is supposed to hold the first extension 310, with some of the fingers over the stopper 312 and the other fingers under the stopper 312.

For example, the stopper 312 may be positioned between the index finger and the middle finger.

According to this arrangement, when a user holds the first extension 310, the longitudinal axis A1 of the suction unit 5 may pass through the user's wrist.

When the longitudinal axis A1 of the suction unit 5 passes through the user's wrist and the user's arm is stretched, the longitudinal axis A1 of the suction unit 5 may be substantially aligned with the user's stretched arm. Accordingly, there is the advantage in this state that the user uses minimum force when pushing or pulling the cleaner 1 with the handle 30 in his/her hand.

The handle 30 may include an operation unit 326. For example, the operation unit 326 may be disposed on an inclined surface of the second extension 320. It is possible to input instructions to turn on/off the cleaner (suction motor) through the operation unit 326. For example, it is possible to input instructions to turn on/off the suction motor through the operation unit 326. Further, it is possible to control the intensity of the suction force of the suction motor 20 that has been turned on through the operation unit 326.

The operation unit 326 may be disposed to face a user. The operation unit 326 may be disposed opposite to the stopper 312 with the handle 30 therebetween.

The operation unit 326 is positioned higher than the stopper 312. Accordingly, a user can easily operate the operation unit 326 with his/her thumb with the first extension 310 in his/her hand.

Further, since the operation unit 326 is positioned outside the first extension 310, it is possible to prevent the operation unit 326 from being unexpectedly operated when a user cleans with the first extension 310 in his/her hand.

The battery housing 60 may be disposed under the first extension 310.

The battery 40 may be detachably combined with the battery housing 60. For example, the battery 40 may be inserted into the battery housing 60 from under the battery housing 60.

The rear side of the battery housing 60 and the rear side of the first extension 310 may form a continuous surface. Accordingly, the battery housing 60 and the first extension 310 can be shown like a single unit.

When the battery 40 is inserted in the battery housing 60, the bottom of the battery 40 may be exposed to the outside. Accordingly, when the cleaner 1 is placed on the floor, the battery 40 can be in contact with the floor.

According to this structure, there is the advantage that the battery 40 can be directly separated from the battery housing 60.

Further, since the bottom of the battery 40 is exposed to the outside, the bottom of the battery 40 can come in direct contact with the air outside the cleaner 1, so the battery 40 can be more efficiently cooled.

The battery housing 60 may include an outer housing 600 and an inner housing 610. The inner housing 610 may be inserted under the outer housing 600.

The inner housing 610 may be fixed to one or more of the outer housing 600 and the first body 10. Further, the battery 40 may be coupled to the inner housing 610.

According to the present invention, the inner housing 610 is inserted into the outer housing 600 and then the battery 40 is inserted to be coupled to the inner housing 610, so it is possible to prevent the outer housing 600 from deforming or to prevent the outer housing 600 from being damaged when inserting or separating the battery 40.

Obviously, it may be possible to integrally form the inner housing 610 with the outer housing 600 without separately forming the inner housing 610.

The inner housing 610 may include a pair of hinge coupling portions 620 to which a hinge 162 of the body cover 16 is coupled. The hinge coupling portions 620 may be spaced at a predetermined distance from each other.

The inner housing 628 may have charging stand connection terminals 628 for charging the battery 40 coupled to the inner housing 610. It is possible to bring the charging stand connection terminals 628 in contact with a terminal of a charging stand (not shown) by placing the cleaner 1 on the charging stand.

The battery housing 600 may have battery connection terminals 670 that are connected to battery terminals 490 in the battery 40 inserted in the battery housing 60. The battery connection terminals 670 may be connected to the battery terminals 490 through the top of the battery 40.

Referring to FIG. 3, the cleaner 1 may further include a filter unit 50 having air exits 522 for discharging the air that has passed through the suction motor 20. For example, the air exits 522 may include a plurality of openings and the openings may be circumferentially arranged.

The filter unit 50 may be detachably coupled to the top of the main body 2. The filter unit 50 may be detachably inserted in the second body 12.

When the filter unit 50 is combined with the main body 2, a portion of the filter unit 50 is positioned outside the second body 12. Accordingly, a portion of the filter unit 50 is inserted in the main body 2 through the open top of the main body 2 and the other portion protrudes outside from the main body 2.

The height of the main body 2 may be substantially the same as the height of the handle 30. Accordingly, the filter unit 50 protrudes upward from the main body 2, so a user can easily hold and separate the filter unit 50.

When the filter unit 50 is combined with the main body 2, the air exits 522 are positioned at the upper portion of the filter unit 50. Accordingly, the air discharged from the suction motor 20 is discharged upward from the main body 2.

According to this embodiment, it is possible to prevent the air discharged from the air exits 522 from flowing to a user while the user cleans using the cleaner 1.

The main body 2 may further include a pre-filter 29 for filtering the air flowing into the suction motor 20. The pre-filter 29 may be disposed inside the flow guide 22. Further, the pre-filter 29 is seated over the upper motor housing 16 and may surround a portion of the upper motor housing 26. That is, the upper motor housing 26 may include a filter support for supporting the pre-filter 29.

Figure 6:
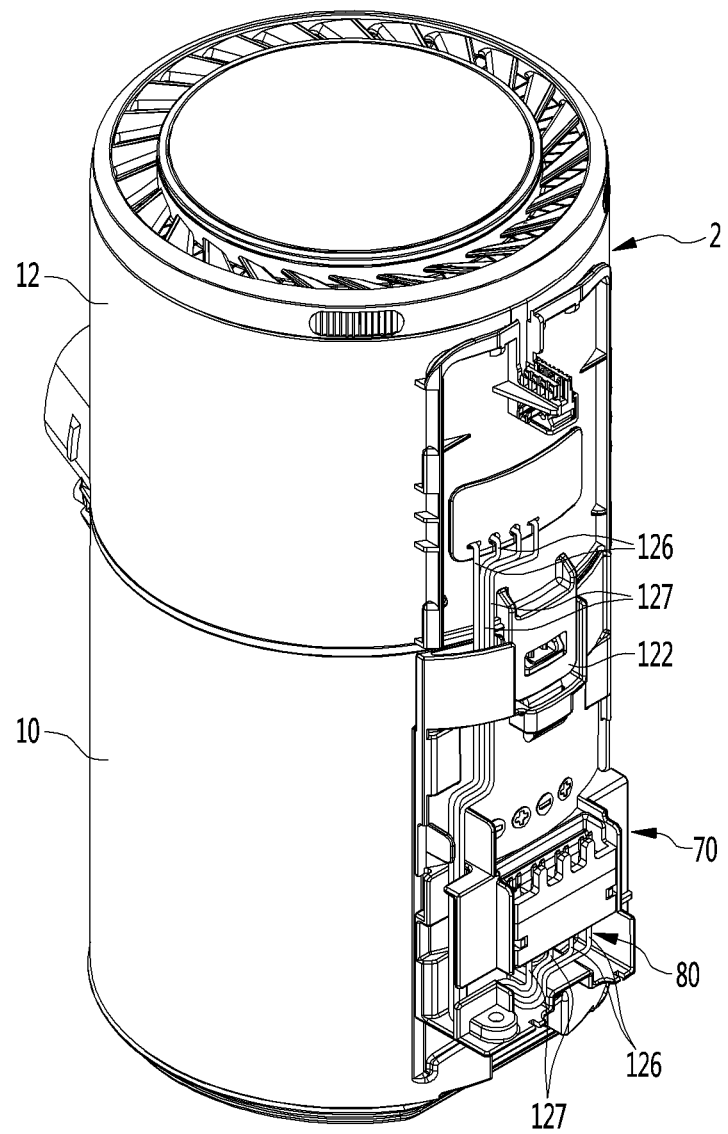
FIG. 6 is an exploded perspective view of the cleaner according to an embodiment of the present invention.
Figure 7:
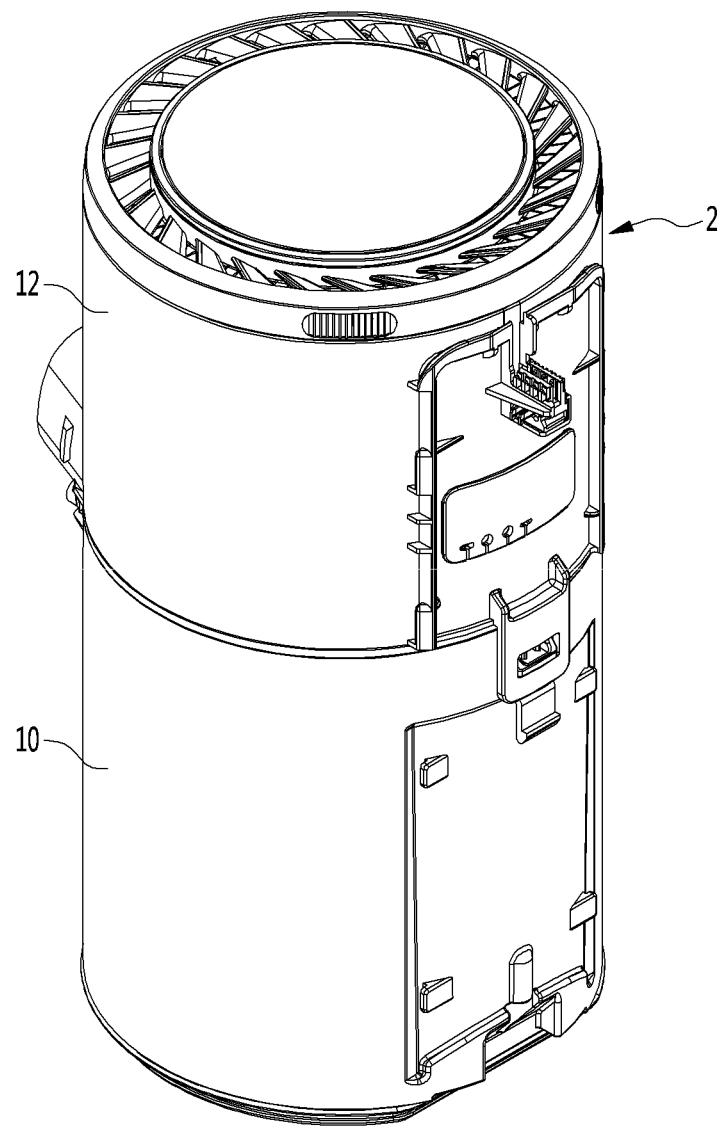
FIG. 7 is a view a main body according to an embodiment of the present invention with a cover member separated.
Figure 8:
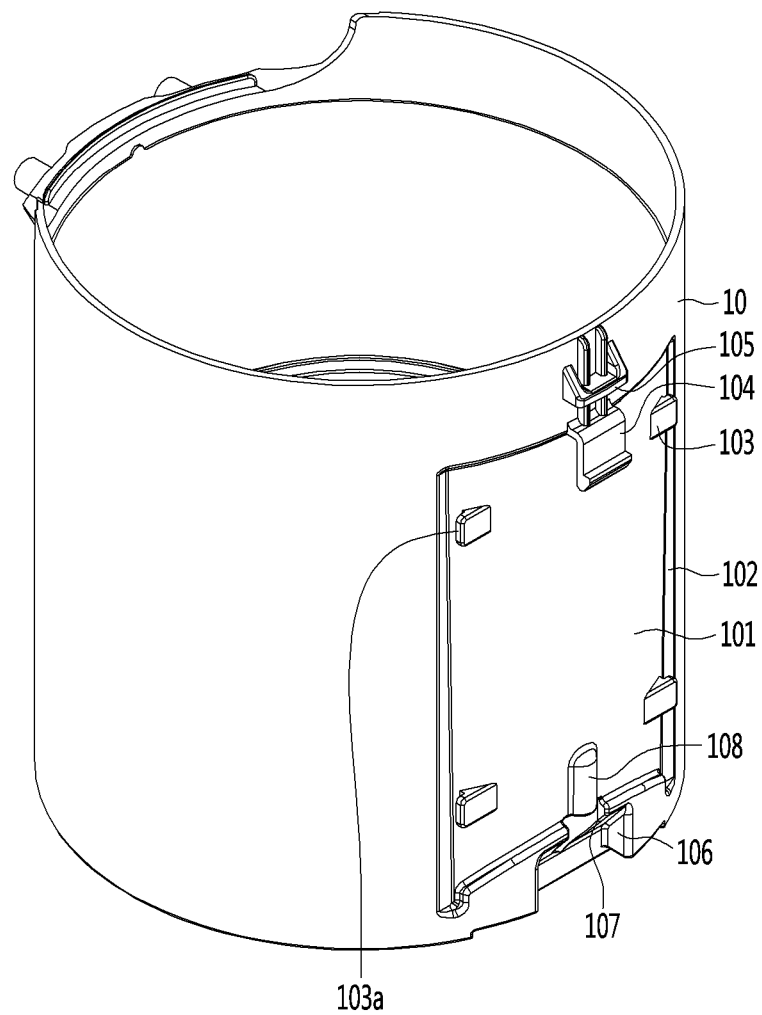
FIG. 8 is a perspective view of a first body according to an embodiment of the present invention.

FIG. 6 is a view the cleaner according to an embodiment of the present invention with the handle unit separated, FIG. 7 is a view showing the main body according to an embodiment of the present invention with a cover member separated, and FIG. 8 is a perspective view of a first body according to an embodiment of the present invention.

Referring to FIGS. 6 to 8, the first body 10 and the second body 12 may be vertically combined with each other.

To this end, the first body 10 has a first coupling portion 105 and the second body 12 has a second coupling portion 122.

The first coupling portion 105 may be a projection formed on the outer side of the first body 10. The second coupling portion 122 may extend downward from the lower portion of the second body 12. The second coupling portion 122 may be a hook that is locked to the projection.

The first coupling portion 105 may be disposed at a predetermined distance downward from the upper end of the first body 10 so that the second coupling portion 122 extending downward from the second body 12 is locked to the first coupling portion 105.

A cover member 70 may be coupled to the first body 10. The cover member 70 can prevent a plurality of main body wires 126 and 127 for transmitting control signals and/or supplying power from being seen from the outside of the first body 10 (or the outside of the dust container 120).

The main body wires 126 and 127 may be connected to a main body terminal 80. The main body wires 126 and 127 may include two first main body wires 126 connected to a suction unit terminal (not shown) in the suction unit 5 and two second main body wires 127 connected to the suction motor 20.

An extension pipe connected to a suction nozzle having a rotary cleaning unit and a motor may be connected to the suction unit 5, so when the extension pipe is connected to the suction unit 5, the motor is electrically connected with the suction unit terminal and can be supplied with power from the battery 40. Alternatively, a suction nozzle having a rotary cleaning unit and a motor may be connected directly to the suction unit 5, in which the motor of the suction nozzle can also be supplied with power from the battery 40.

Some of the main body wires 126 and 127 may be inserted in the second body 12. The others of the main body wires 126 and 127 may extend downward from the second body 12, may be guided by the cover member 70, and then may be connected to the main body terminal 80.

The cover member 70 may support the main body terminal 80 connected with the main body wires 126 and 127. Accordingly, the cover member 70 can prevent the main body wire 80 from being seen from the outside of the first body 10 (or the outside of the dust container 120).

The cover member 70, though not limited, may be coupled to the opposite side to the suction unit 5 in the first body 10. When the cover member 70 is disposed opposite to the suction unit 5 in the first body 10, it can be covered with the handle unit 3, so the cover member 70 cannot be exposed to the outside.

The first body 10 may have a recessed contact surface on the outer surface of the first body 10 to seat the cover member 70.

The contact surface may include a rounded first contact surface 101 and flat second contact surfaces 102 at both sides of the first contact surface 101.

The first body 10 may further include a cover coupling hook 104 for coupling the cover member 70.

The first body 10 may further include a first coupling portion 105 to be combined with the second body 12.

The cover coupling hook 104 may be disposed at a predetermined distance under the first coupling portion 105. The cover coupling hook 104 may extend downward under the first coupling portion 105 to prevent interference between the second coupling portion 112 and the cover hook 104 that has been coupled to the first coupling portion 105.

Since the second contact surfaces 102 are disposed at both sides of the first contact surface 101, it is possible to prevent the cover member 70 coupled to the first body 10 from horizontally rotating around the first body 10.

The first body 10 may include one or more locking ribs 103 for maintaining the cover member 70 stably coupled.

For example, the first body 10 may include a plurality of locking ribs 103 to prevent up-down and left-right movement of the cover member 70.

The locking ribs 103 may protrude from the first contact surface 101 of the first body 10 and may be horizontally and vertically spaced apart from each other.

For example, two horizontally spaced locking ribs 103 may extend away from each other.

Ends 103a of at least some of the locking ribs 103 may be arranged to face the second contact surfaces 102 at a predetermined distance from the second contact surfaces 102. That is, spaces may be defined between the ends 103a of the locking ribs 103 and the second contact surfaces 102.

The first body 10 may further include a housing fastening portion 108 to be fastened to the inner housing 610. A fastener such as a screw may be coupled to the housing fastening portion 108.

In order that the fastener can be coupled to the housing fastening portion 108, a portion of the housing fastening portion 108 may protrude outward from the first body 10 and the other portion may protrude inward from the first body 10. For example, the housing fastening portion 108 may protrude outward and inward from the first contact surface 101.

The housing fastening portion 108 may vertically extend so that the fastener can be vertically coupled to the housing fastening portion 108.

The housing fastening portion 108 may be spaced upward from the lower end of the first body 10.

Accordingly, the first body 10 may further include a recession 106 that provides a space for movement of a fastener and a guide groove 107 that guides the fastener in the recession so that the fastener can be coupled to the housing fastening portion 108.

Figure 9:
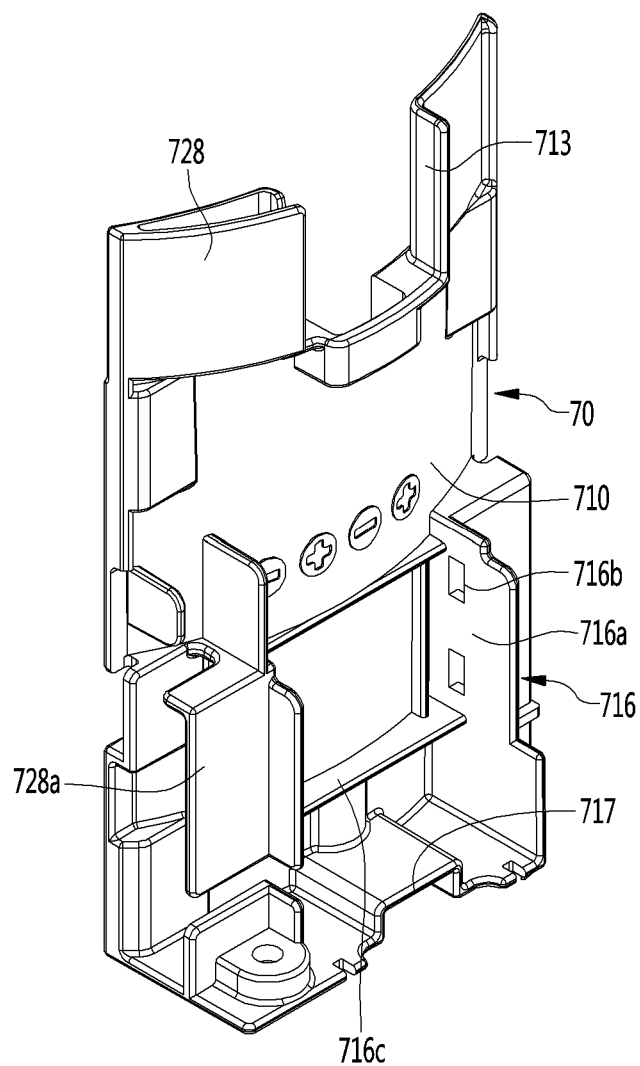
FIGS. 9 and 10 are perspective views of a cover member according to an embodiment of the present invention.
Figure 10:
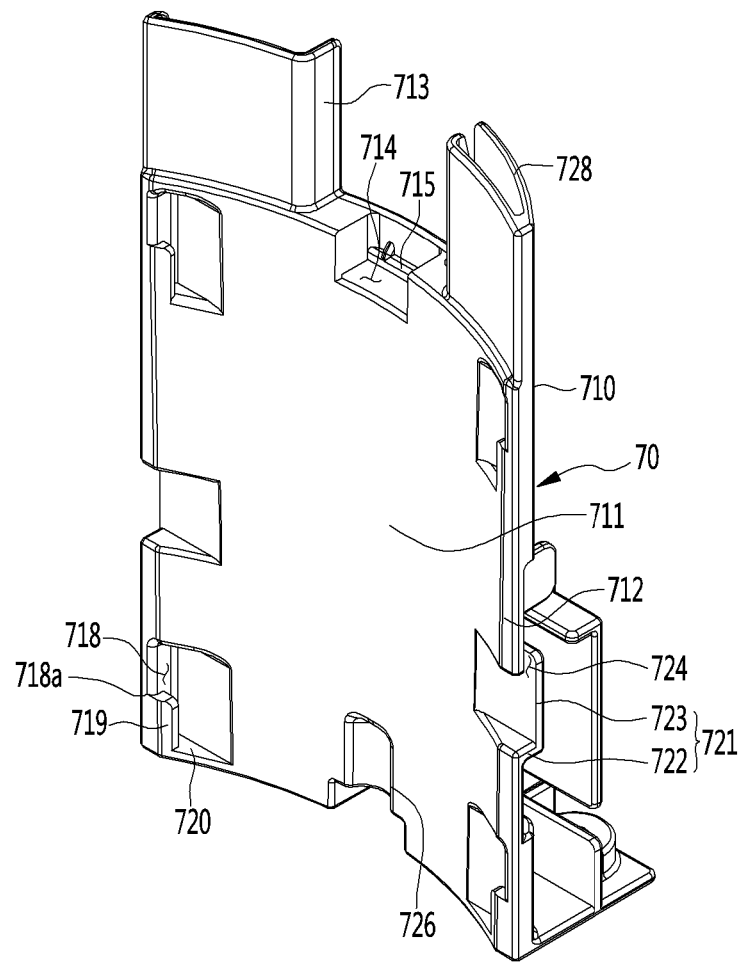

FIGS. 9 and 10 are perspective views of the cover member according to an embodiment of the present invention.

Referring to FIGS. 6 to 10, the cover member 70 may have a cover body 710 supposed to be brought in contact with the outer side of the first body 10.

The cover body 710 may include a first cover body 711 that is in contact with the first contact surface 101 and second cover bodies 712 that are disposed at both sides of the first cover body 711 to be brought in contact with the second contact surfaces 102.

The first cover body 711 may include a rounded surface to come in contact with the first contact surface 101.

The second cover bodies 712 may include a flat surface to come in contact with the second contact surfaces 102.

The cover body 710 may further include a receiving space 713 for receiving the second coupling portion 132 of the second body 12. The receiving space 713 may be formed at the upper center portion of the cover body 710.

The cover body 710 may further include a slot 714 for passing the cover coupling hook 104 and a hook locking portion 715 for locking the cover coupling hook 104 passing through the slot 714.

The slot 714 is disposed at a lower side of the receiving space 713. Therefore, according to the present invention, the cover coupling hook 104 can be locked to the hook locking portion 715 sequentially through the receiving space 713 and the slot 714. The second coupling portion 122 of the second body 12 can be inserted into the receiving space 713 without interference with the cover body 710.

The receiving space 713 is a space spaced apart from both sides of the cover body 710, so when the second coupling portion 122 of the second body 12 is inserted in the receiving space 713, the cover body 710 cannot be horizontally moved by the second coupling portion 122.

The cover body 710 may further include rib receiving spaces 718 for receiving the locking ribs 103 of the first body 10, retaining ribs 719 for preventing the locking ribs 103 in the rib receiving spaces 718 from moving away radially from the first body 10, and rib support sides 720 for supporting the locking ribs 103 in the rib receiving spaces 718.

The retaining ribs 719 may be disposed under inlets 718a of the rib receiving spaces 718.

The cover body 710 may further include second handle coupling portions 721 for coupling the handle unit 3.

The second handle coupling portions 721 may include a first extension 722 horizontally extending from the cover body 710 and a second extension 723 extending upward from the first extension 722.

At least a portion of the second extension 723 may face a first surface of the cover body 710.

In the cover body 710 of the present invention, the surface that comes in contact with the first body 10 may be a second surface and the opposite surface to the second surface may be the first surface.

Accordingly, an insertion opening 724 is formed between the second extensions 723 and the first surface of the cover body 710.

Insertion ribs 304 (see FIG. 16) of the handle unit 3 may be inserted into the insertion openings 724.

Figure 22:
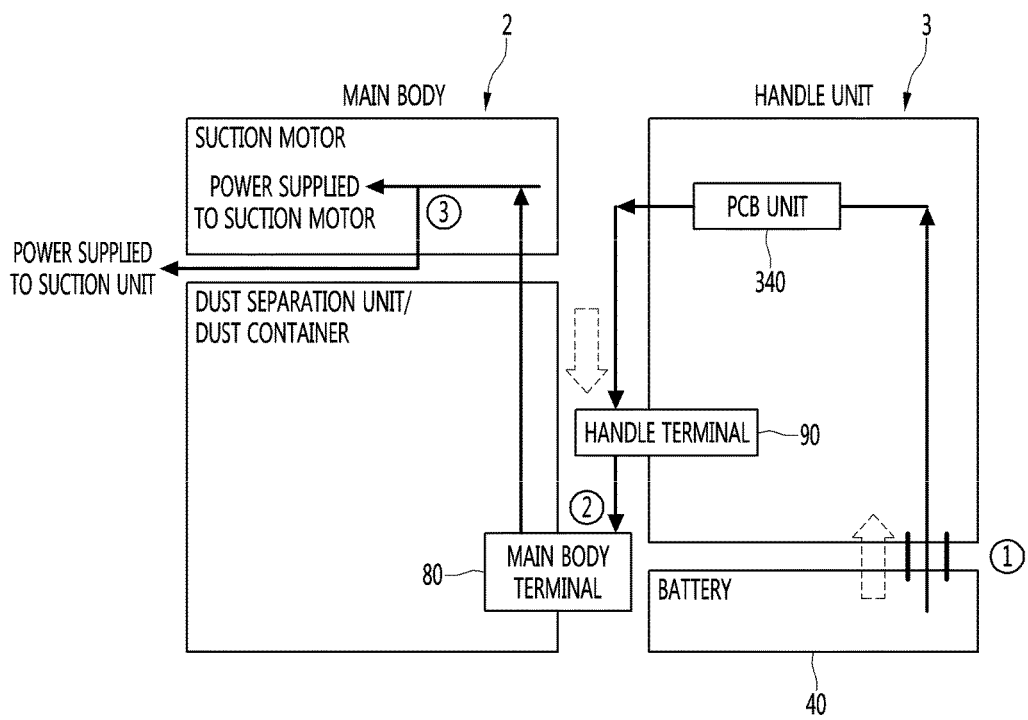
FIG. 22 is a conceptual diagram schematically showing the assembly configuration of the cleaner of the present invention.

The cover body 710 may include a terminal mount 716 for mounting a main body terminal 80 (see FIG. 22). The terminal mount 716 may include a plurality of horizontally spaced coupling ribs 716a and coupling holes 716b for coupling the main body terminal 80 may be formed on each of the coupling ribs 716a.

Accordingly, the main body terminal 80 may be coupled to the coupling holes 716b between the coupling ribs 716a.

When the main body terminal 80 is coupled to the coupling holes 716b, the main body terminal 80 cannot be moved downward in the process of coupling the handle terminal 90 of the handle unit 3 to the main body terminal 80.

The vertical length of the coupling ribs 716a may be larger than the vertical length of the main body terminal 80. This is for making the coupling ribs 716a guide the handle terminal 90 (see FIG. 22) and the main body terminal 80 when the handle terminal 90 is coupled to the main body terminal 80.

The cover body 710 may further include a terminal support 716c for supporting the main body terminal 80. The terminal support 716c, for example, may connect the bottoms of the coupling ribs 716a.

Accordingly, it is possible to prevent the main body terminal 80 from being pushed down when coupling the handle terminal 90 of the handle unit 3 to the main body terminal 80 supported by the terminal support 716c.

The terminal mount 716 may be formed on a first side of the cover body 710.

The cover body 710 may further include one or more guide ribs for guiding the main body wires 126 and 127.

The guide ribs may include an upper guide rib 728 and a lower guide rib 728a.

The main body wires 126 and 127 are guided by the guide ribs 728 and 728a and may be connected to the main body terminal 80 from under the main body terminal 80.

According to the present invention, since the terminal mount 716 is formed on the first side of the cover body 710 and the main body terminal 80 is mounted on the terminal mount 716, when the main body wires 126 and 127 are connected to the bottom of the main body terminal 80, the cover body 710 is positioned between the first body 10 and the main body terminal 80 and main body wires 126 and 127.

Therefore, even if the first body 10 is made of a transparent or translucent material, the main body wires 126 and 127 and the main body terminal 80 are not seen from the outside of the first body 10.

The cover body 710 may further include a fastening portion groove 726 in which the housing fastening portion 108 of the first body 10 is positioned to prevent interference with the housing fastening portion 108.

The cover body 710 may further include a handle hook coupling portion 717 for coupling a handle hook 306 (see FIG. 14) of the handle unit 3.

Figure 11:
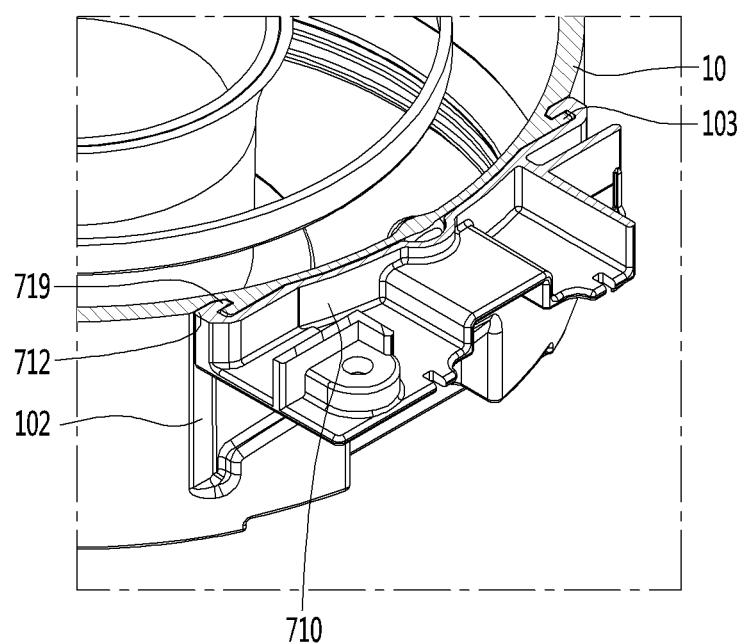
FIG. 11 is a horizontal cross-sectional view after the cover according to an embodiment of the present invention is combined with the main body.
Figure 12:
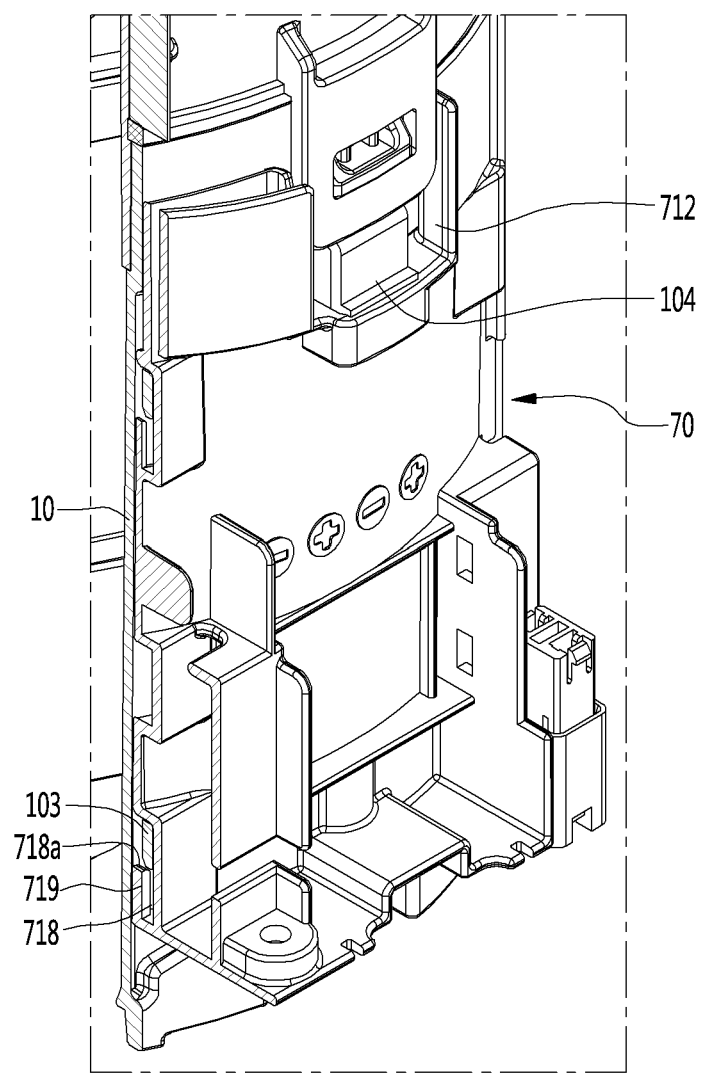
FIG. 12 is a vertical cross-sectional view before the cover member according to an embodiment of the present invention is combined with the main body.
Figure 13:
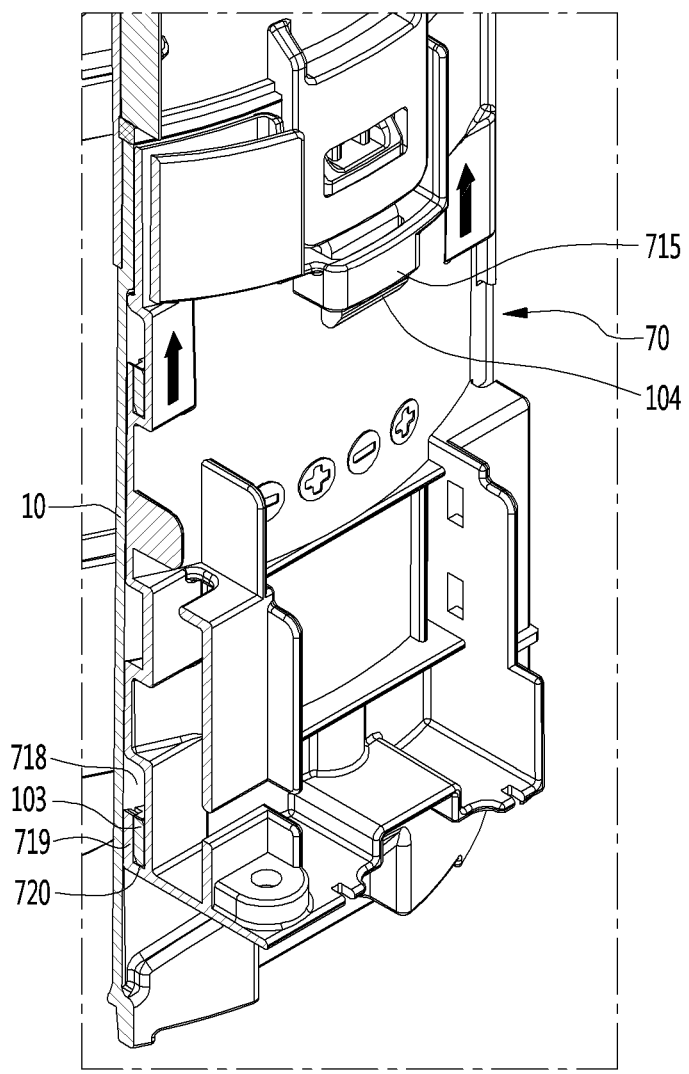
FIG. 13 is a vertical cross-sectional view after the cover is coupled to the main body.

FIG. 11 is a horizontal cross-sectional view after the cover member according to an embodiment of the present invention is coupled to the main body, FIG. 12 is a vertical cross-sectional view before the cover member is coupled to the main body, and FIG. 13 is a vertical cross-sectional view after the cover member according to an embodiment of the present invention is coupled to the main body.

Referring to FIGS. 11 to 30, in order to couple the cover member 70 to the first body 10, the inlets 718a of the rib seats 718 of the cover body 710 are aligned with the locking ribs 103 of the first body 10.

In this state, a portion of the second coupling portion 122 of the second body 12 has been positioned in the receiving space 713 of the cover body 710.

In this state, the cover body 710 is brought in contact with the first body 10. That is, the first cover body 711 is brought in contact with the first contact surface 101 of the first body 10 and the second cover bodies 712 are brought in contact with the second contact surfaces 102 of the first body 10. Further, the locking ribs 103 of the first body 10 are inserted into the rib seats 718.

In this state, as shown in FIG. 13, the cover member 70 is pushed up. Accordingly, the locking ribs 103 of the first body 10 are brought in close contact with the ribs support sides 720 and the cover coupling hook 104 is locked to the hook locking portion 715 through the slot 714 of the cover body 710.

After the cover coupling hook 104 is locked to the hook locking portion 715, the cover member 70 cannot be moved down.

Further, after the locking ribs 103 of the first body 10 are brought in close contact with the rib support sides 720, the cover member 70 cannot be moved upward due to the locking ribs 103.

Further, the retaining ribs 719 are positioned between the second contact surfaces 102 of the first body 10 and the locking ribs 103, so the cover member 70 cannot be moved radially outward from the first body 10.

Figure 14:
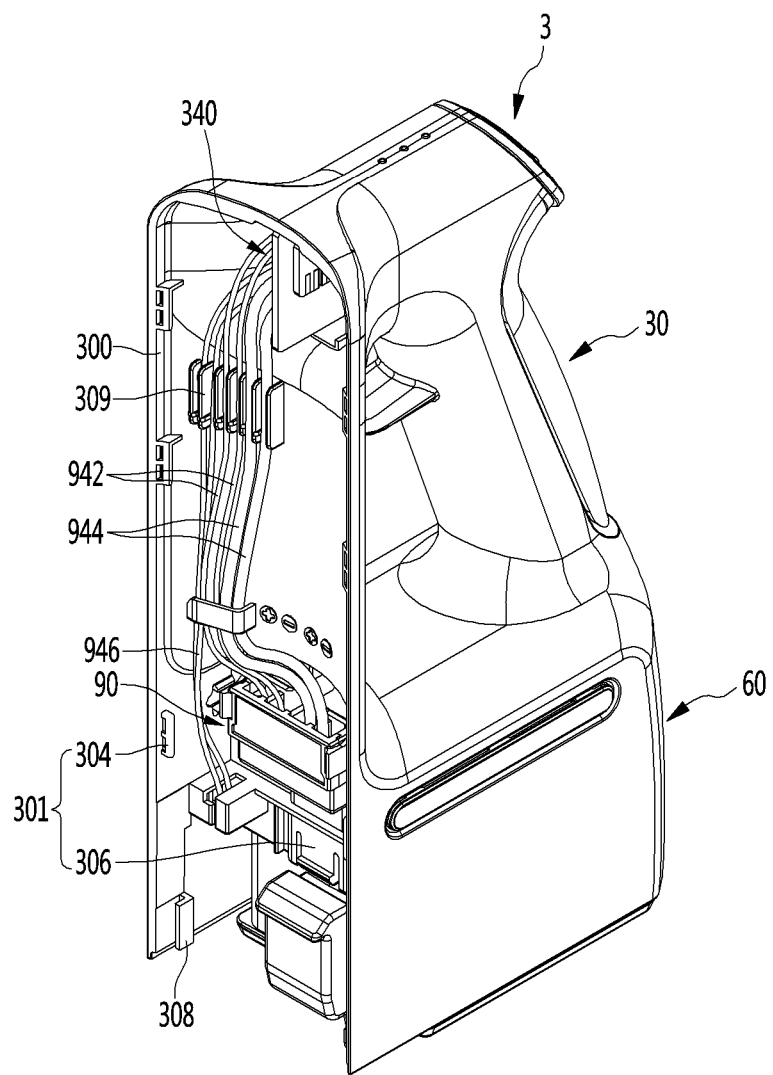
FIG. 14 is a perspective view of a handle unit according to an embodiment of the present invention.

FIG. 14 is a perspective view of the handle unit according to an embodiment of the present invention.

Referring to FIG. 14, the handle unit 3 may include a handle body 300 that covers the main body 2 in contact with the outer side of the main body 2.

The handle body 300 defines the handle 30 and the battery housing 60.

The handle body 300 may include a cover coupling portion 301 for coupling the cover member 70.

The handle unit 3, for example, may be vertically coupled to the cover member 70 by the cover coupling portion 301.

The cover coupling portion 301 may include a handle hook 306 that is coupled to the handle hook coupling portion 717 of the cover member 70.

The cover coupling portion 301 may further include insertion ribs 304 that are coupled to the second handle coupling portions 721 of the cover member 70.

The handle body 300 may further include housing coupling ribs 308 for coupling the inner housing 610.

The handle unit 3 may further include the handle terminal 90 that is connected to the main body terminal 80 mounted on the cover member 70.

The handle unit 3 may further include a plurality of handle wires 942, 944, and 946. The handle wires 942, 944, and 946 may be connected to a PCB unit 340.

The PCB unit 340 may be connected to the battery 40. Further, the PCB unit 340 may receive operation signals from the operation unit 326. The PCB unit 340 may supply power to the suction motor 20 and/or the suction unit terminal or control the intensity of the suction force of the suction motor 20 on the basis of the input operation signals.

The handle wires 942, 944, and 946 may include first handle wires 942 connected to the handle terminal 90 to supply power to the suction unit terminal (not shown) of the suction unit 5 and second handle wires 944 connected to the handle terminal 90 to supply power to the suction motor 20.

When the handle unit 3 is connected to the main body 2, the first handle wires 942 may be connected to the first main body wires 126 of the main body 2 and the second handle wires 944 may be connected to the second main body wires 127 of the main body 2.

The handle wires 942, 944, and 946 may further have terminal connection wires 946 connected to the charging stand connection terminals 628.

The handle unit 3 may further have wire guides 309 that guide the handle wires to prevent the handle wires 942, 944, and 946 from getting entangled.

The handle terminal 90 is positioned between the terminal coupling hooks 305a and 305b and coupled to the terminal coupling hooks 305 and 305b.

Figure 15:
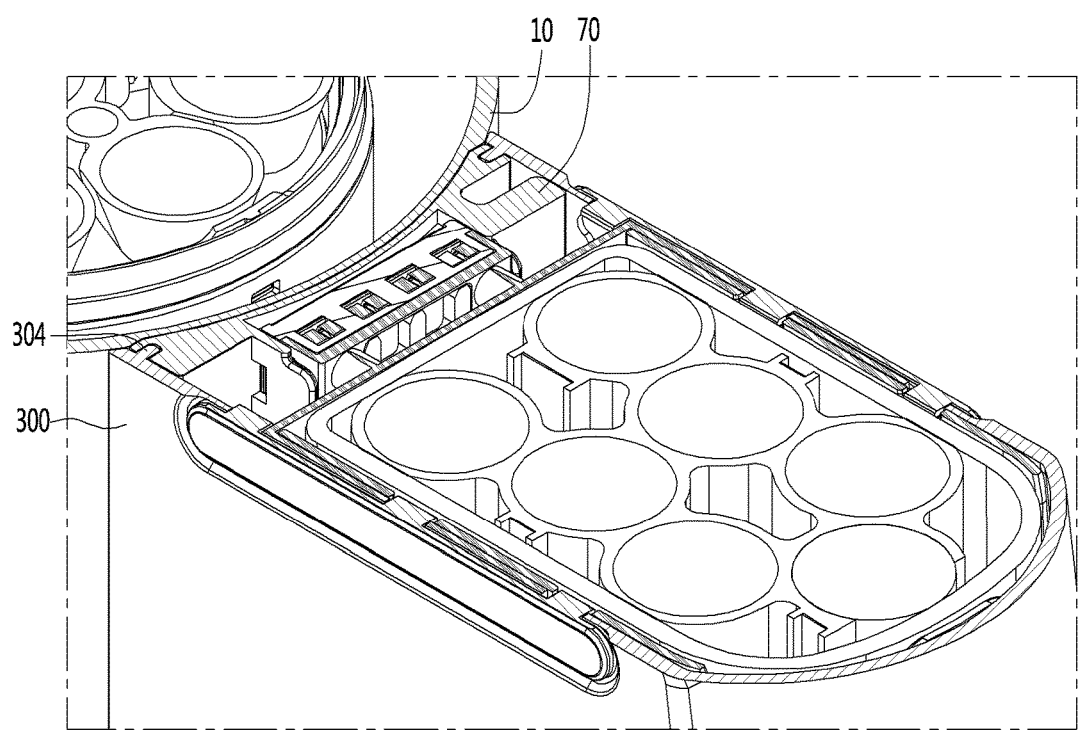
FIG. 15 is a horizontal cross-sectional view after the handle unit shown in FIG. 14 is coupled to the cover member.
Figure 16:
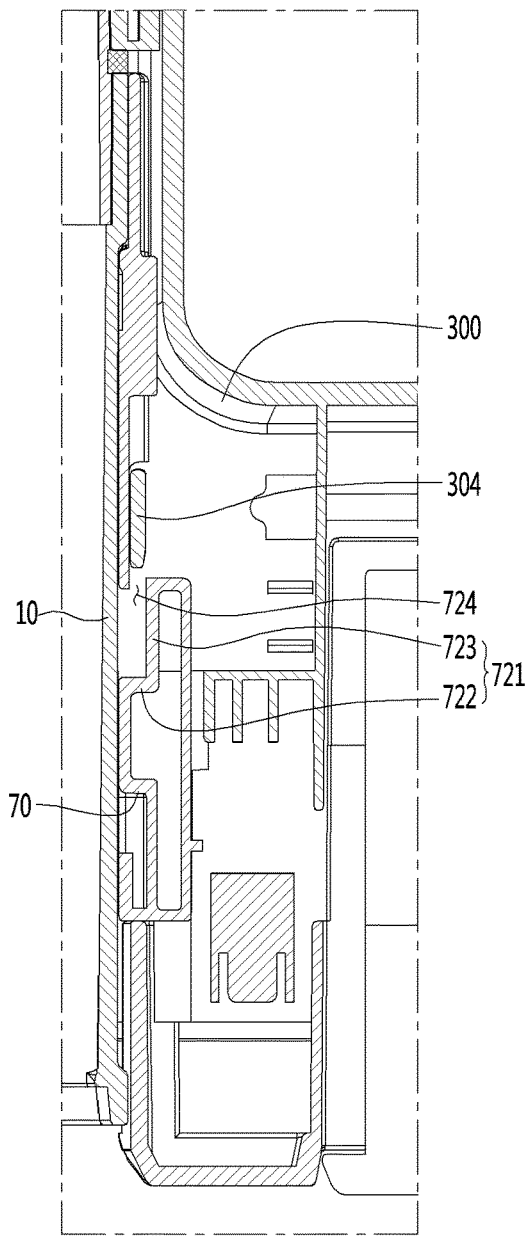
FIG. 16 is a vertical cross-sectional view before the handle unit is coupled to the cover member.
Figure 17:
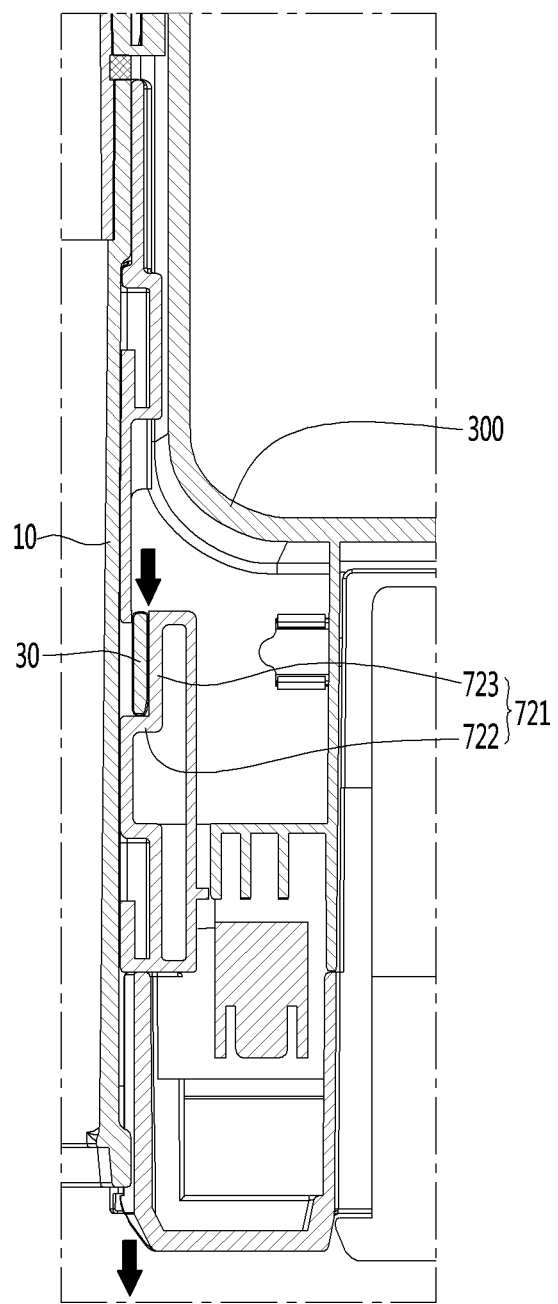
FIG. 17 is a vertical cross-sectional view after the handle unit is coupled to the cover member.
Figure 18:
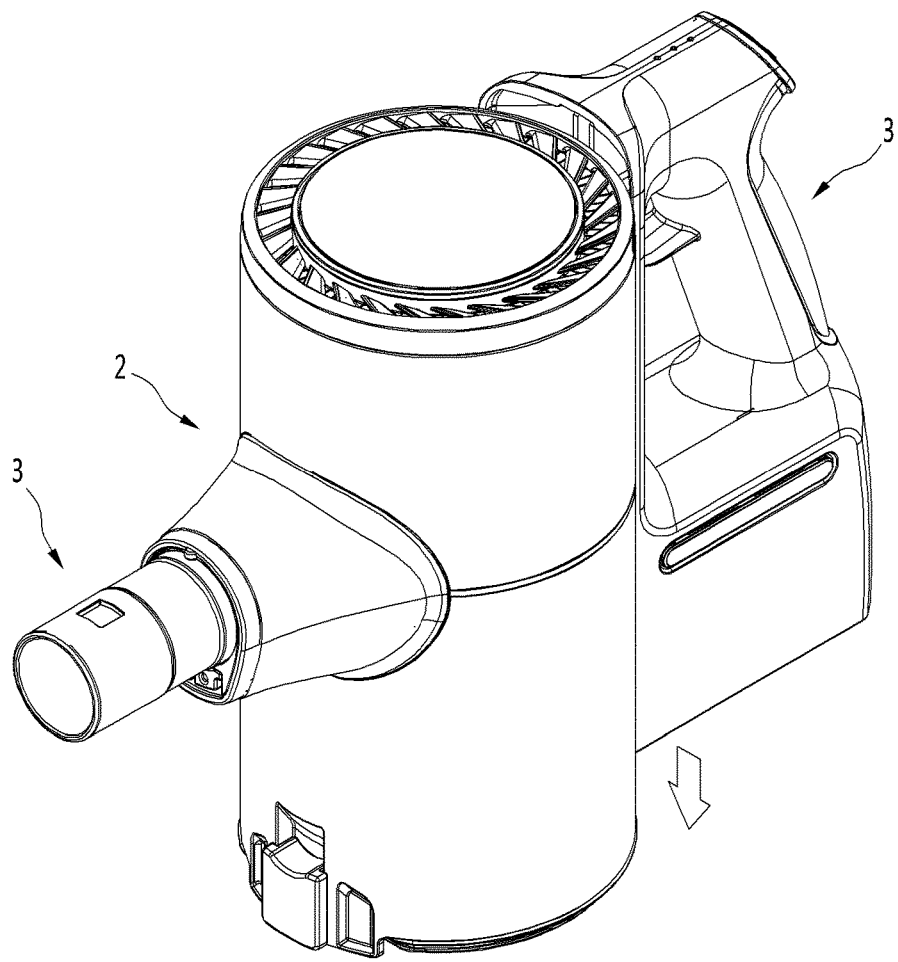
FIG. 18 is a view when the handle unit is coupled to the main body.

FIG. 15 is a horizontal cross-sectional view after the handle unit shown in FIG. 14 is coupled to the cover member, FIG. 16 is a vertical cross-sectional view before the handle unit is coupled to the cover member, FIG. 17 is a vertical cross-sectional view after the handle unit is coupled to the cover member, and FIG. 18 is a view when the handle unit is coupled to the main body.

Referring to FIGS. 9 and 14 to 18, in order to couple the handle unit 3 to the cover member 70, the insertion ribs 304 of the handle unit 3 may be aligned with the insertion openings 724 of the handle coupling portions 721 of the cover body 710.

In this state, when the handle unit 3 is pushed down, the insertion ribs 304 of the handle unit 3 are brought in contact with the first extensions 722 of the handle coupling portions 721 through the insertion openings 724 and locked to the second extensions 723.

Further, the handle hook 306 of the handle unit 3 is locked to the handle hook coupling portion 717 of the cover body 710. Further, the handle terminal 90 is connected to the main body terminal 80. That is, the handle terminal 90 is connected to the main body terminal 80 when the handle unit 3 is pushed down to be coupled to the cover member 70.

The coupling ribs 716a of the cover member 70 guide the handle terminal 90 and the main body terminal 80. Further, when the handle terminal 90 is coupled to the main body terminal, the coupling ribs 716a can cover portions of both sides of the handle terminal 90.

Therefore, according to the present invention, since the handle terminal 90 and the main body terminal 80 are connected to each other when the handle unit 3 is coupled to the cover member 70, the process of combining the handle terminal 90 and the main body terminal 80 can be removed, so a user can more conveniently combine the terminals.

Since the handle unit 3 is slide-coupled to the cover body 70 by the insertion ribs 302 of the handle unit 3 and the handle coupling portions 721 of the cover member 70, it is possible to stably combine the handle terminal 90 and the main body terminal 80.

Figure 19:
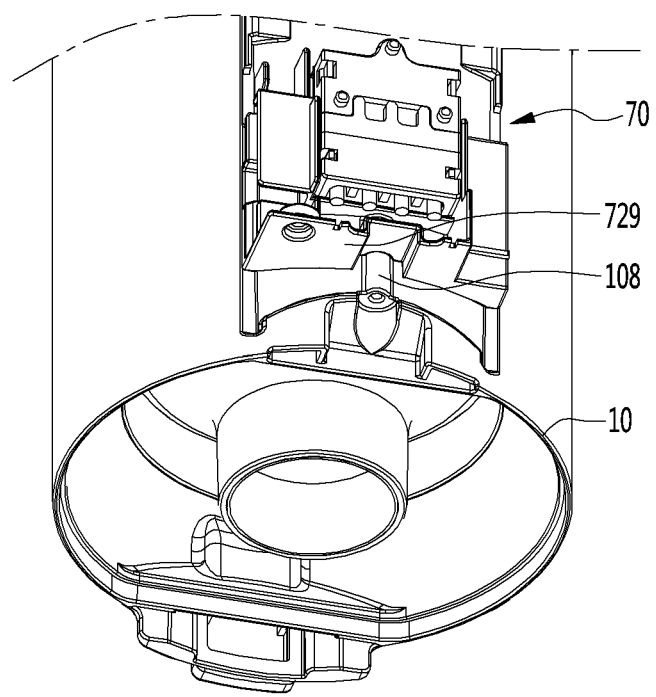
FIG. 19 is a perspective view after the cover member is coupled to the main body.
Figure 20:
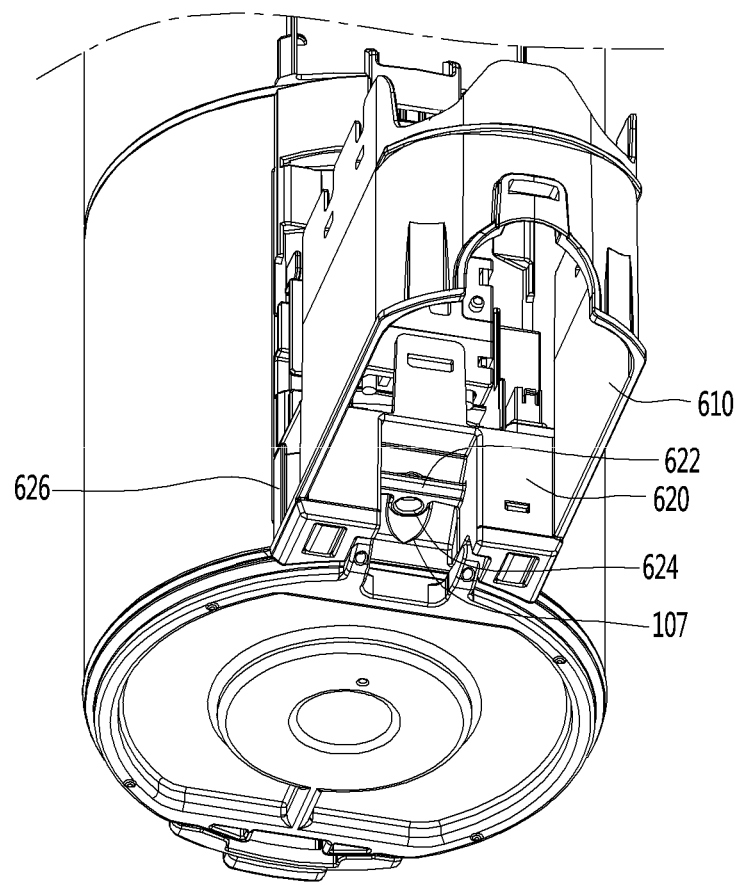
FIG. 20 is a perspective view after an inner housing is coupled to the main body combined with the cover member.
Figure 21:
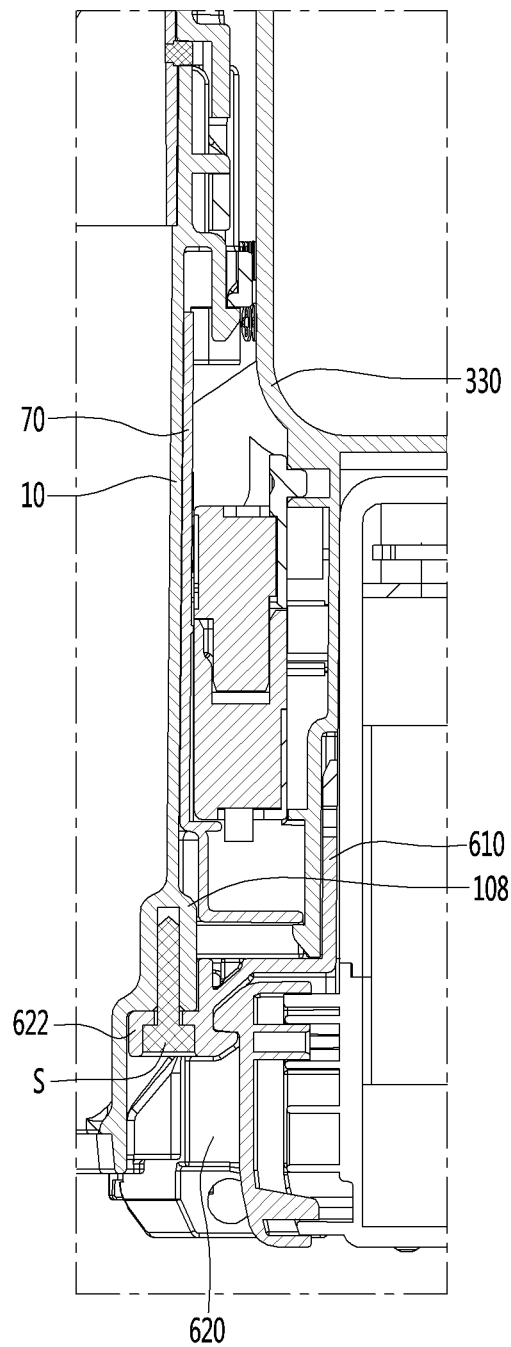
FIG. 21 is a cross-sectional view after the inner housing is coupled to the main body.

FIG. 19 is a cross-sectional view after the cover member is coupled to the main body, FIG. 20 is a perspective view after an inner housing is coupled to the main body combined with the cover member, and FIG. 21 is a cross-sectional view after the inner housing is coupled to the main body.

Referring to FIGS. 19 to 21, when the cover member 70 is coupled to the first body 10, the bottom 729 of the cover body 70 is spaced apart from the bottom of the first body 10. Further, the bottom 729 of the cover member 70 is positioned higher than the lower end of the housing fastening portion 108.

A space for the hinge coupling portions 620 of the inner housing 610 is defined between the bottom 729 of the cover body 70 and the lower end of the first body 10.

A fastening rib 622 for fastening the housing fastening portion 108 of the first body 10 is disposed between the hinge coupling portions 620 of the inner housing 610. The fastening rib 622 connects the hinge coupling portions 620 to each other.

The fastening rib 622 may include a fastening hole 624 for a fastener S.

A portion of the fastening rib 622 is positioned in the guide groove 107 of the first body 10. When being positioned in the guide groove 107, the fastening rib 622 is in contact with the bottom of the housing fastening portion 108.

In this state, it is possible to fasten the fastening rib 622 and the housing fastening portion 108 to each other using the fastener S from under the fastening rib 622.

The inner housing 610 may include rib coupling portions 626 for coupling the housing coupling ribs 308 of the handle unit 3. For example, the rib coupling portions 626 may be formed at the hinge coupling portions 620, respectively.

Accordingly, the inner housing 610 can be coupled to the first body 10 and the handle unit 3.

FIG. 22 is a conceptual diagram schematically showing the combination structures of the cleaner of the present invention.

Referring to FIGS. 4, 18 and 22, the present invention may include, as described above, the main body 2, the handle unit 3, and the battery 40.

The cleaner 1 of the present invention have largely three combination structures for power supply.

The first combination structure is the structure for combining the battery 40 and the handle unit 3. The battery 40 is separably coupled to the handle unit 3 in the present invention.

When the battery 40 is coupled to the handle unit 3, the battery 40 is connected to the main PCB unit 340. The battery 40 and the handle unit 3 are combined by mechanically combining the battery terminal 490 and the battery connection terminal 670. Obviously, since the main PCB unit 340 is connected to the battery connection terminal 670 through wires, when the battery terminal 490 and the battery connection terminal 670 are combined, they are electrically connected, so the power from the battery 40 can be supplied to the main PCB unit 340.

The second combination structure of the present invention is the structure for combining the handle unit 3 and the main body 2.

When the handle unit 3 is vertically slide-coupled to the main body 2, with the main PCB unit 340 connected to the handle terminal 90, the handle terminal 90 and the main body terminal 80 are mechanically combined. Obviously, when the handle terminal 90 and the main body terminal 80 are combined, they are electrically connected, so power can be supplied to the main body terminal 80 through the handle terminal 90 from the main PCB unit 340.

The handle unit 3 has the cover coupling portion 301 and the cover member 70 has the insertion openings 724 and the handle hook coupling portion 717 for coupling the cover coupling portion 301. Accordingly, the handle unit 3 can be stably combined with the cover member 70, and in this process, the handle terminal 90 can be accurately coupled to the main body terminal 80. That is, the cover coupling portion 301, the insertion openings 724, and the handle hook coupling portion 717 guide the handle terminal 90 and the main body terminal 80 that are combined with each other, so an assembly error of the handle terminal 90 and the main body terminal 80 is reduced.

Since the handle unit 3 has the body coupling portion 304 and the second body 12 of the main body 2 has the first handle coupling portions 139a and 139b, the handle unit 3 can be stably combined with the second body 12, and in this process, the handle terminal 90 can be accurately coupled to the main body terminal 80. That is, the body coupling portion 304 and the first handle coupling portions 139a and 139b also guide the handle terminal 90 and the main body terminal 80 that are combined with each other, so an assembly error of the handle terminal 90 and the main body terminal 80 is reduced.

Further, as described above, the coupling ribs 716a for coupling the main body terminal 80 and the terminal support 716c for supporting the bottom of the main body terminal 80 are formed on the cover member 70. Accordingly, the main body terminal 80 is not pushed down when the handle terminal 90 is coupled to the main body terminal 80, so the assembly error of the handle terminal 90 and the main body terminal 80 is reduced.

The third combination structure of the present invention is the combination structure among the main body wires electrically connected to the main body terminal 80, the suction motor 20 in the main body 2, and the first terminal 139. This combination structure is an electrically connected structure positioned in the main body 2 and achieved by the main body wires. The power supplied to the main body terminal 80 can be finally supplied to the suction motor 20 and the first terminal 139 by the electrically combined structure.

According to the combination structures of the present invention, air channels are formed only in the main body 2 and are not formed in the handle unit 3.

Accordingly, there is no need for a structure for sealing the boundary between the handle unit 3 and the main body 2 when the handle unit 3 is coupled to the main body 2.

Therefore, the structure for coupling the handle unit 3 to the main body 2 is simple and the coupling is easy.

In the present invention, the suction motor 20 and the first terminal 139 receive power from the battery 40, so they may be called power receiving components.

According to the present invention, since the cover member is disposed in the transparent o translucent dust container and the wires are guided to the main body terminal by the cover member, the cover member covers the wires, so the wires are not seen from the outside of the dust container.

Further, since the main body terminal is supported by the cover member, the main body terminal is not seen from the outside of the dust container.

Further, the handle unit has the handle terminal connected with the main body terminal and is slide-coupled to the cover member. Accordingly, the main body terminal and the battery terminal can be coupled when the handle unit is coupled to the cover member.

Further, since the main body terminal is coupled to the coupling ribs and maintained in this state, the main body terminal is not pushed down when the handle terminal is coupled to the main body terminal, so misassembly of the handle terminal and the main body terminal can be prevented.

Further, since the main body terminal is supported by the terminal support, the main body terminal is not pushed down when the handle terminal is coupled to the main body terminal, so misassembly of the handle terminal and the main body terminal can be prevented.

What is claimed is:

1. A cleaner comprising:
   a suction unit that is configured to suction air and dust;
   a main body having a front portion that is connected to the suction unit, the main body including:
     a dust separation unit that is configured to separate dust from air suctioned through the suction unit, and
     a dust container that is configured to receive the dust separated by the dust separation unit, at least a portion of the dust container being transparent or translucent;
   a handle unit connected to a rear portion of the main body and configured to receive a battery;
   a suction motor disposed in the main body and configured to generate suction force;
   wires that connect the suction motor to the handle unit; and
   a cover member that is coupled to the main body and located between the dust container and the wires, the cover member covering at least a portion of the transparent or translucent portion of the dust container to thereby prevent the wires from being seen from outside through the dust container.

2. The cleaner of claim 1, wherein the cover member is coupled to the rear portion of the main body and is, based on the handle unit being coupled to the main body, covered by the handle unit.

3. The cleaner of claim 2, wherein the cover member is configured to be slide-coupled to the main body by sliding in a first direction relative to the main body, and the handle unit is configured to be slide-coupled to the cover member by sliding in a second direction opposite the first direction.

4. The cleaner of claim 1, wherein the handle unit is configured to couple to the cover member and includes a handle terminal, and wherein the cover member includes a main body terminal that is configured, based on the handle unit being coupled to the cover member, to connect to the handle terminal.

5. The cleaner of claim 4, wherein the cover member includes a plurality of coupling ribs that are spaced apart from each other and configured to support the main body terminal, and wherein the main body terminal is coupled to and disposed between the plurality of coupling ribs.

6. The cleaner of claim 5, wherein the plurality of coupling ribs are configured to guide the handle terminal toward the main body terminal and, based on the handle terminal being coupled to the main body terminal, cover both lateral sides of the handle terminal.

7. The cleaner of claim 4, wherein the cover member includes a terminal support that is configured to support a bottom of the main body terminal.

8. The cleaner of claim 4, wherein the cover member includes guide ribs that are configured to guide the wires to be connected to the main body terminal.

9. The cleaner of claim 4, wherein the handle unit includes a handle hook, and the cover member includes a handle hook coupling portion that is configured to be coupled to the handle hook.

10. The cleaner of claim 9, wherein the handle unit includes insertion ribs, and the cover member includes a handle coupling portion that defines insertion openings, the insertion openings being configured to receive the insertion ribs to thereby slide-couple the handle unit to the cover member.

11. The cleaner of claim 1, wherein:
   the main body include a first body, the first body including the dust container;
   the cover member includes a cover body that contacts the first body;
   the first body includes a cover coupling hook; and
   the cover body defines a slot that is configured to receive the cover coupling hook, and includes a hook locking portion that is configured to lock the cover coupling hook that passes through the slot.

12. The cleaner of claim 11, wherein the first body includes locking ribs, and the cover body includes:
   rib seats configured to receive the locking ribs;
   retaining ribs configured to limit movement of the locking ribs in the rib seats away from the first body; and
   rib support sides configured to support the locking ribs in the rib seats.

13. The cleaner of claim 11, wherein the first body includes a recessed contact surface that is recessed from an outer surface of the first body and configured to contact the cover member, the recessed contact surface including a first contact surface that is curved and second contact surfaces that are flat, and
   wherein the first contact surface includes a plurality of locking ribs that are horizontally spaced apart and extend away from each other.

14. The cleaner of claim 13, wherein the suction motor is located vertically above the first body.

15. The cleaner of claim 1, wherein the suction unit includes a suction unit terminal, and the wires are electrically coupled to the suction unit terminal.

16. The cleaner of claim 1, wherein the wires are electrically coupled to the suction motor.

\* \* \* \* \*